US012381310B2

(12) United States Patent
Graf et al.

(10) Patent No.: US 12,381,310 B2
(45) Date of Patent: Aug. 5, 2025

(54) AIRCRAFT ANTENNA ARRAY AND LIGHTING SYSTEM INTEGRATIONS

(71) Applicant: Rockwell Collins, Inc., Cedar Rapids, IA (US)

(72) Inventors: Joseph T. Graf, Center Point, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 904 days.

(21) Appl. No.: 17/519,279

(22) Filed: Nov. 4, 2021

(65) Prior Publication Data

US 2024/0405410 A1 Dec. 5, 2024

Related U.S. Application Data

(60) Provisional application No. 63/110,839, filed on Nov. 6, 2020.

(51) Int. Cl.
*H01Q 1/28* (2006.01)
*H01Q 1/42* (2006.01)
*H01Q 9/04* (2006.01)

(52) U.S. Cl.
CPC .............. *H01Q 1/28* (2013.01); *H01Q 1/42* (2013.01); *H01Q 9/0464* (2013.01)

(58) Field of Classification Search
CPC ............ H01Q 1/06; H01Q 1/28; H01Q 1/286; H01Q 1/42; H01Q 9/0464; H01Q 21/20; B64C 1/36; B64D 47/02

See application file for complete search history.

(56) References Cited

U.S. PATENT DOCUMENTS

| 5,488,456 | A  | 1/1996  | Jamzadeh |
| 6,646,613 | B1 | 11/2003 | Cheng |
| 7,741,782 | B2 | 6/2010  | Vermeulen et al. |
| 8,227,732 | B2 | 7/2012  | Kito et al. |
| 9,184,497 | B2 | 11/2015 | Chen et al. |
| 9,345,105 | B2 | 5/2016  | De Jong et al. |
| 9,445,483 | B2 | 9/2016  | Louh et al. |

(Continued)

FOREIGN PATENT DOCUMENTS

| CN | 108963411 A  | 12/2018 |
| CN | 208820056 U  | 5/2019  |

(Continued)

OTHER PUBLICATIONS

Partial Search Report in European Application No. 21206968.6 dated Mar. 23, 2022, 13 pages.

*Primary Examiner* — Dameon E Levi
*Assistant Examiner* — Leah Rosenberg
(74) *Attorney, Agent, or Firm* — Suiter Swantz IP

(57) ABSTRACT

Disclosed are embodiments of antenna assemblies for integration with aircraft lighting systems. The antenna assemblies in some embodiments include a ground plane, a patch antenna positioned on the ground plane, and a radome covering the patch antenna. The patch antenna and radome are configured as an annular ring for positioning around a light fixture received through a center opening through each of the ground plane, patch antenna, and radome such that the antenna assembly can mount and connect to the aircraft utilizing the light fixture aperture without the need for a separate antenna aperture.

9 Claims, 7 Drawing Sheets

(56) References Cited

U.S. PATENT DOCUMENTS

| | | |
|---|---|---|
| 9,635,742 B2 | 4/2017 | Sun et al. |
| 9,871,290 B1 | 1/2018 | DeMersseman |
| 10,009,984 B2 | 1/2018 | Creemers et al. |
| 9,960,475 B2 | 5/2018 | Chen et al. |
| 9,967,958 B2 | 5/2018 | Creemers et al. |
| 10,080,274 B2 | 9/2018 | Johnson |
| 10,355,340 B2 | 7/2019 | Marinus et al. |
| 10,487,990 B2 | 11/2019 | Gielen et al. |
| 10,655,833 B2 | 5/2020 | Freer et al. |
| 2006/0103576 A1* | 5/2006 | Mahmoud ............... H01Q 1/28 343/700 MS |
| 2006/0152941 A1 | 7/2006 | Chiang |
| 2012/0306710 A1* | 12/2012 | Mishan ................. H01Q 3/26 343/784 |
| 2014/0168020 A1 | 6/2014 | Stoytchev et al. |
| 2015/0280316 A1 | 10/2015 | Tso |
| 2016/0227636 A1* | 8/2016 | Sun ...................... H05B 47/19 |
| 2017/0270786 A1 | 9/2017 | Swaminathan et al. |
| 2017/0301991 A1* | 10/2017 | Stratis ................... H01Q 1/42 |
| 2017/0317400 A1 | 11/2017 | Robinson |
| 2018/0129170 A1 | 5/2018 | Yun et al. |
| 2019/0215935 A1 | 7/2019 | Trublowski et al. |
| 2019/0393613 A1 | 12/2019 | Kakuya et al. |
| 2020/0015340 A1 | 1/2020 | Louh et al. |
| 2020/0214114 A1* | 7/2020 | Wu ...................... F21V 23/0435 |
| 2022/0119091 A1* | 4/2022 | Graf ..................... H01Q 1/286 |
| 2023/0216182 A1* | 7/2023 | Retali ................... H01Q 1/28 343/708 |

FOREIGN PATENT DOCUMENTS

| | | |
|---|---|---|
| DE | 10354632 A1 | 6/2005 |
| DE | 102004057515 A1 | 6/2006 |
| DE | 102005008378 A1 | 8/2006 |
| DE | 202006009591 U1 | 10/2006 |
| EP | 0559546 A1 | 9/1993 |
| EP | 1297353 A1 | 4/2003 |
| EP | 3132183 A1 | 2/2017 |
| FR | 2875473 A1 | 3/2006 |
| GB | 672611 A | 5/1952 |
| KR | 100891731 B1 | 4/2009 |
| KR | 101269033 B1 | 6/2013 |
| WO | 2014169502 A1 | 10/2014 |
| WO | 2017005435 A1 | 1/2017 |
| WO | 2018065404 A1 | 4/2018 |
| WO | WO-2023021291 A1 * | 2/2023 ............ H01Q 1/286 |

\* cited by examiner

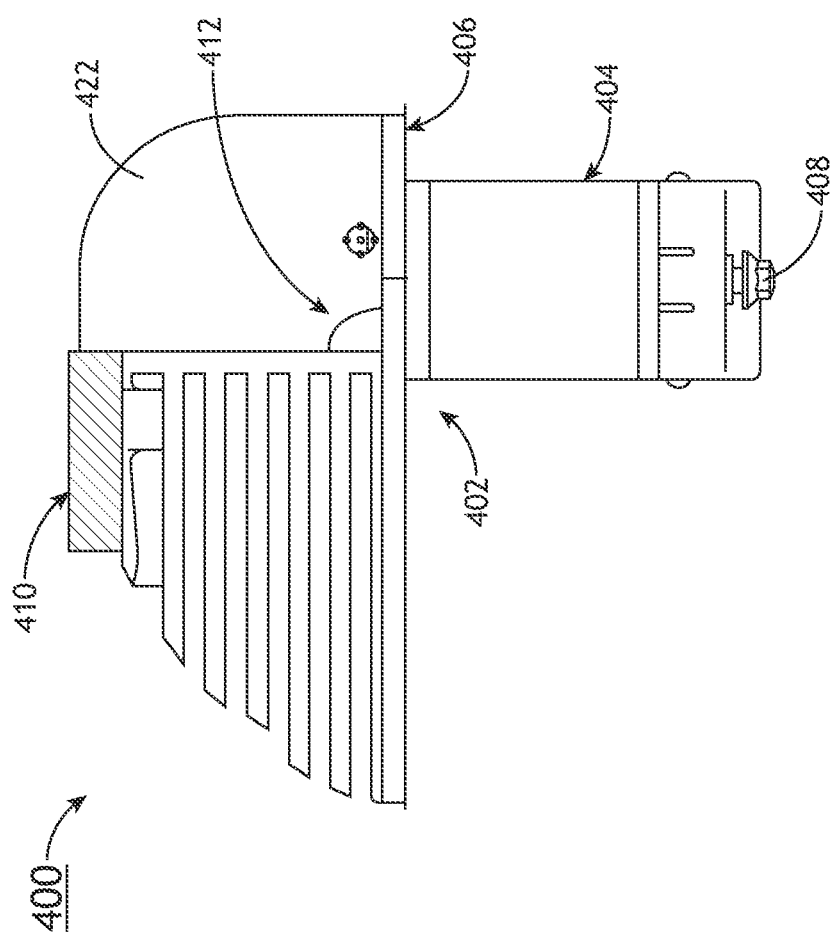

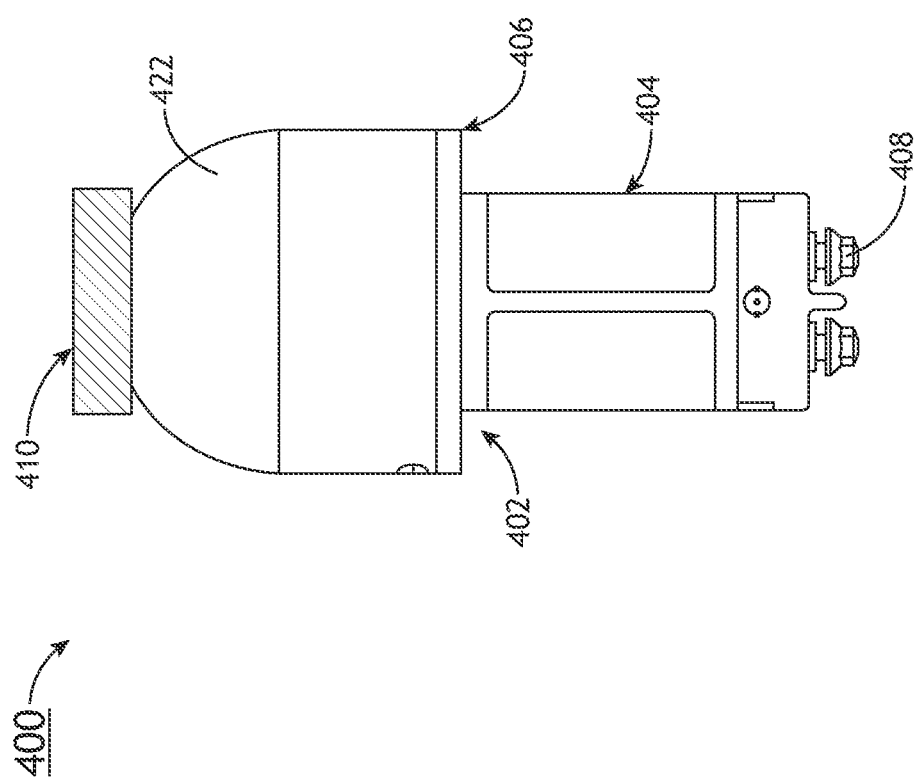

AIRCRAFT ANTENNA ARRAY AND LIGHTING SYSTEM INTEGRATIONS

CROSS-REFERENCE AND RELATED APPLICATION

This nonprovisional application claims the benefit of U.S. Provisional Application No. 63/110,839 filed Nov. 6, 2020 and entitled AIRCRAFT ANTENNA ARRAY AND LIGHTING SYSTEM INTEGRATION, the entirety of which in incorporated by reference herein.

TECHNICAL FIELD

The subject matter disclosed herein relates generally to aircraft antenna arrays and more particularly to structural implementations of antenna arrays for integration with aircraft lighting systems.

BACKGROUND

There is a critical need to reduce drag and antenna count in high-performance aircraft such as attack helicopters and fighter jets. Many of these aircraft require dozens of apertures on the airframe for mounting communication, sensing and other flight-critical equipment, as well as for mounting lighting equipment for flight and safety. Each antenna assembly and associated structurally reinforced aperture adds weight and drag on the aircraft which impact mission performance and mission length.

Therefore, what is needed are solutions for integrating antenna arrays with existing aircraft lighting systems to reduce the total number of apertures needed on an airframe.

SUMMARY

To achieve the foregoing and other advantages, in a first embodiment the present disclosure provides an antenna assembly for mounting integration with an aircraft light fixture, the antenna assembly including a ground plane having a center opening, a patch antenna positioned on and electrically connected to the ground plane, the patch antenna configured as an annular ring having an inner circumferential surface and an outer circumferential surface concentrically formed, and a center opening formed at least in part by the inner circumferential surface, and a radome covering the patch antenna, the radome having a center opening. When assembled, the center opening of each of the ground plane, the patch antenna, and the radome vertically align to receive a portion of a light fixture therethrough, and wherein the inner circumferential surface of the patch antenna is dimensioned such that the light fixture when received through the center opening of the ground plane, the patch antenna, and the radome is positioned within the bounds of the inner circumferential surface of the patch antenna.

In some embodiments, the radome may have an annular ring shape corresponding to the annular ring shape of the patch antenna.

In some embodiments, a portion of the radome may be integrally formed with a portion of the light fixture.

In some embodiments, the radome may be adapted to mount to at least one of the light fixture and an aircraft fuselage.

In some embodiments, each of the ground plane and the patch antenna may be conformable to a curved aircraft fuselage.

In some embodiments, the patch antenna may include a first reduced surface wave (RSW) antenna configured to resonate in the global positioning system (GPS) L1 band and a second RSW Antenna configured to resonate in the GPS L2 band, wherein the first RSW sits atop the second RSW antenna, and wherein a bottom metallization of the first RSW antenna may be a metallurgical co-joint with the top metallization of the second RSW antenna.

be configured as a reduced surface wave (RSW) antenna comprising a first conducting layer configured to resonate in the global positioning system (GPS) L1 band and a second conducting layer configured to resonate in the GPS L2 band, wherein the first and second conducting layers are separated by a dielectric layer.

In some embodiments, functionality of the patch antenna may be mutually exclusive of functionality of the light fixture.

In some embodiments, the annular ring of the patch antenna may be circular or elliptical.

According to another aspect, the present invention provides a multi-element communications and lighting assembly, comprising a housing containing a global positioning system (GPS) multi-element array including a plurality of periphery antenna elements, and a light fixture positioned within the housing in substantially the center of the plurality of periphery antenna elements.

In some embodiments, the assembly further includes a cover closing a top opening of the housing, wherein the light fixture includes at least one light element visible through the cover.

In some embodiments, the light fixture includes a transparent lens positioned atop or integrally formed with the cover.

In some embodiments, the cover may be optically transparent such that the at least one light element is visible through the cover.

In some embodiments, functionality of the at least one light element may be mutually exclusive of functionality of the GPS multi-element array.

Embodiments of the present disclosure may include any combination of the features disclosed herein.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4A is a side elevation view of an integrated assembly formed as an aircraft exterior light in accordance with an exemplary embodiment of the present disclosure;

FIG. 4B is an end view of the integrated aircraft assembly of FIG. 4A;

DETAILED DESCRIPTION

Figure 1:
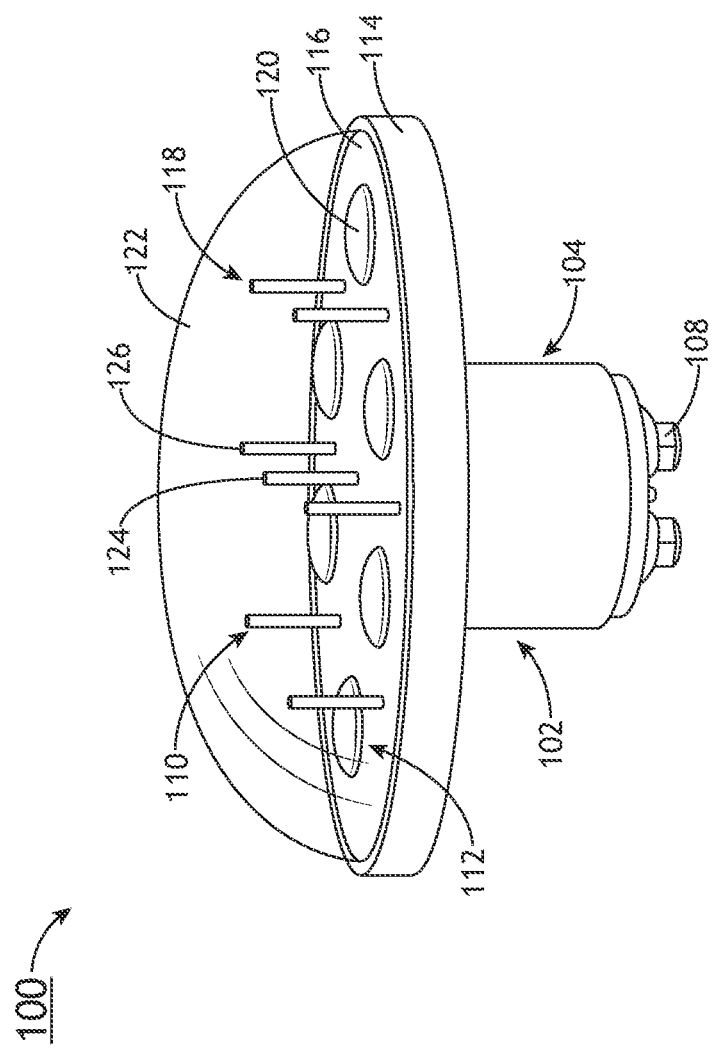
FIG. 1 illustrates an integrated assembly including interspersed antenna and lighting elements in accordance with an exemplary embodiment of the present disclosure.

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure provides embodiments of combination antenna arrays and lighting systems and configurations of antenna arrays for integration with aircraft lighting systems.

Referring to FIG. 1, an integrated assembly 100 in accordance with a first embodiment of the present disclosure is shown. The integrated assembly 100 includes an aerodynamic housing 102 configured for mounting to an aircraft fuselage. The housing 102 generally includes a first portion 104 for being received through a structurally reinforced aperture formed in an airframe and a second portion 106 for being positioned external to the aircraft, for instance mounted against the aircraft skin or streamlined into the surface of the aircraft. The first and second portions 104, 106 may be coupled together or may be integrally formed. One or more connectors 108 may be provided at a terminal end of the first portion 104 for connecting with one or more of a power source, light control, radio frequency (RF) control, RF cabling, etc., internal to the aircraft.

In some embodiments, the second portion 106 may be positioned 'atop' the first portion 104, and as shown, may envelope separate systems that may function independently (e.g., mutually exclusive) or may be operationally coupled. In some embodiments, the systems may include an antenna system 110 and a lighting system 112. For example, the antenna system 110 may include an antenna array configured to provide one or more of communication, navigational, sensing, and flight-critical functions, while the lighting system 112 may include at least one lighting element for illuminating the exterior of the aircraft or visible from outside the aircraft. In some embodiments, the housing 102 may be implemented in the form of an exterior aircraft light and the antenna system 110 may be positioned internal or external to the aerodynamic housing 102. In other embodiments, the housing may be implemented in the form of an aircraft antenna assembly and the lighting system 112 may be positioned internal or external to the aerodynamic housing 102.

In some embodiments, the housing 102 may be formed as an exterior aircraft light and the lighting system 112 may be configured to provide illumination for such operations as navigation, landing, taxiing, positional indication, collision avoidance, inspection lighting, etc. Lighting elements may be white or colored. For example, in an embodiment in which multiple integrated assemblies 100 are provided as a set of navigation lights, a first integrated assembly may be configured to produce white light, a second integrated assembly may be configured to produce green light (via the light or lens), and a third integrated assembly may be configured to produce red light (via the light or lens). In some embodiments, the lights may be configured for one or more of steady operation, intermittent flashing, and dimming. In some embodiments, the lighting system 112 may be implemented as an anticollision light including at least one rotating beam light and motor for rotating the same, and the integrated assembly may be installed on the vertical stabilizer. In some embodiments, the lighting system 112 may be implemented as a landing and/or taxi light, the integrated assembly may include a parabolic reflector for directing the beam of light, and the integrated assembly may be installed on the nose or leading edge of the wing.

As shown in FIG. 1, the second portion 106 envelopes the antenna system 110 and the lighting system 112. The second portion 106 may include a bezel 114 surrounding a base plate 116, wherein the base plate 116 functions as the substrate for an antenna array 118 and the mounting surface for the one or more individual light fixtures 120 of the lighting system 112. In some embodiments, the second portion 106 may include a transparent or translucent hemispherical lens 122 coupled to the base plate 116 for covering and protecting the light and antenna elements, and in some embodiments, focusing the beam of light.

Embodiments disclosed herein are not limited to any particular antenna type, configuration, or count. For example, while a monopole based parasitic array is shown, other parasitic arrays can be utilized such as a parasitic array including microstrip patch radiating elements. In some embodiments, the antenna array 118 may be a parasitic array, for instance the C-band parasitic array as shown. In an alternative embodiment, the antenna array may include a Ku-band array positioned amongst the monopole. The base plate 116 (e.g., antenna substrate) may be at least partially formed from printed circuit board material and may include a 'top' surface, a 'bottom' surface, and a ground plane associated with the bottom surface. A central element 124 connects to the base plate 116. For example, the central element 124 may be a monopole element or a monopole-type radiating element, for instance an ultra-wide band (UWB) monopole structure. The central element 124 may be connected to the base plate 116 and the ground plane at the generally central location of the base plate 116 as shown. In some embodiments, the central element 124 may be an omni-directional element configured to radiate electromagnetic energy in an omni-directional radiation pattern. In some embodiments, the central element 124 may be configured for being connected to a feed line such as an RF feed line, coaxial cable, printed circuit transmission line (e.g., microstrip, stripline, etc.), and/or the like.

The antenna array 118 may further include a plurality of parasitic elements 126, for example, formed as parasitic pins as shown. In a non-limiting example, the antenna array 118 may include six (6) parasitic elements 126 arranged in a ring around and encircling the central element 124. However, it is understood that varying numbers of parasitic elements may be implemented in the antenna array as well as varying positional arrangements. For example, the antenna array 118 may include one or more additional rings of parasitic elements positioned in relation to the central element 124 and/or the first ring. Each of the plurality of parasitic elements 126 is also connected to the base plate 116 and may be connected to a load such as a load circuit or a variable impedance load. In some embodiments, each parasitic element 126 may have a corresponding load circuit connected (e.g., physically and electrically) to its base portion and/or the ground plane associated with the 'bottom' surface of the base plate 116.

In some embodiments, each load circuit may be an adjustable load circuit or a parasitic load circuit. The load circuit may include a plurality of diodes (e.g., two diodes such as two p-type, intrinsic, n-type (PIN) diodes, one or more capacitors configured for being connected to at least one of the PIN diodes, a resistor configured for being connected to at least one of the one or more capacitors, and a Direct Current (DC) bias current source configured for being connected to the resistor. In some embodiments, the DC bias current source may be configured for providing DC bias current to the resistor thereby producing a voltage across the resistor. In further embodiments, the resistor and capacitor(s) may form a low pass filter for providing the DC bias current to the diodes. In some embodiments, the load circuit may be configurable for allowing a variable (e.g., adjustable) impedance to be applied to the load circuit's corresponding parasitic element.

The central element 124 (e.g., monopole element) may be configured to receive RF energy via the feed line, and based upon the received RF energy, configured to radiate electromagnetic energy (e.g., electromagnetic waves) in multiple directions toward the plurality of parasitic elements 126 to produce a voltage across the parasitic elements 126. The applied impedance provided to each parasitic element 126 via its corresponding load circuit can be selectively varied to cause the antenna array 118 to manipulate the omni-directional monopole field radiated by the monopole element and to radiate either multiple directional beams or an omni-beam in a monopole-like radiation pattern. In some embodiments, the antenna array 118 may be operable at low frequencies down to L-band and high frequencies up to Ku-band, depending on configuration and implementation.

The lighting system 112 generally includes one or more light fixtures 120, for instance solid-state light emitting diodes (LEDs) as shown. LEDs may be preferable over incandescent light bulbs in aircraft applications due to their good visibility, high reliability, comparatively small size, lightweight, low power consumption, quick transition time between intensity changes, resistance to vibration, etc. As shown, the lighting system 112 includes a plurality of individual LED fixtures 120 (e.g., six (6) LED fixtures) each mounted on the 'top' surface of the base plate 116 and collectively arranged to form a ring of LED fixtures 120 around and encircling the central element 126. As shown, the LED fixtures 120 are interspersed with the parasitic elements 126, for example, positioned in the same ring in an alternating fashion such that each LED fixture 120 is positioned between two spaced parasitic elements 126 and each parasitic element 126 is positioned between two spaced LED fixtures 120. LED fixture and parasitic element type, count and position may be based on desired beam and wavelength performance, among other parameters. Positional arrangements other than rings are envisioned, for instance linear arrays. In some embodiments, the lighting system 112 may include a focusing element or reflector associated with the LED fixtures 120. Individual LED fixtures may have the same angle of orientation, different angles of orientation, or arranged in groupings having predetermined angles of orientation.

The antenna system 110 and the lighting system 112 may be operably and communicatively coupled to one or more control units configured to interface with the aircraft power system. In some embodiments, the antenna system 110 and the lighting system 112 may be electrically coupled to the same control unit and interface with the same aircraft power system. The control unit may form part of the integrated assembly 100 or may be located internal to the aircraft as a component of a dedicated aircraft system. In some embodiments, the control unit is configured to vary the power supplied to the LED fixtures 120 as a group or individually.

Figure 2:
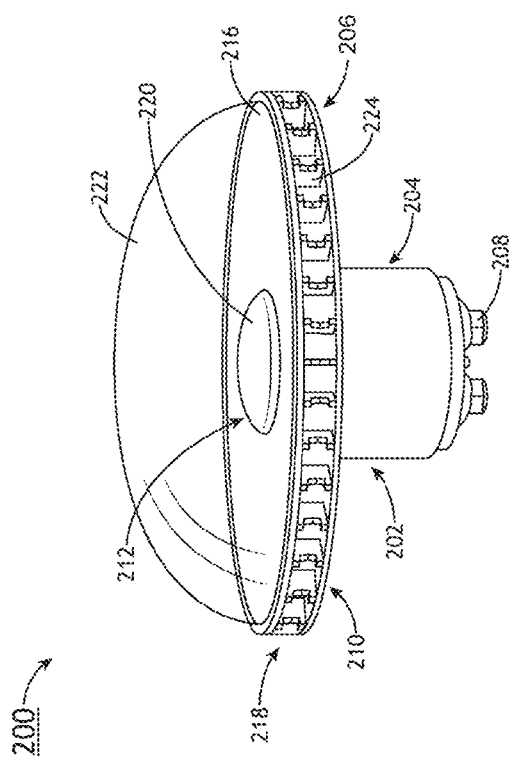
FIG. 2 illustrates an integrated assembly including an antenna array mounted proximate a lighting element in accordance with an exemplary embodiment of the present disclosure.

Referring to FIG. 2, another embodiment of an integrated assembly is shown generally at 200. Like the first embodiment discussed above, the integrated assembly 200 generally includes an aerodynamic housing 202 including a first portion 204 and a second portion 206 positioned 'atop' the first portion, and one or more electrical connectors 208 provided at the terminal end of the first portion 204 for being electrically coupled to a power source within the aircraft, among other couplings. The integrated assembly 200 further includes an antenna system 210 and a lighting system 212.

Whereas in the first integrated assembly 100 the antenna elements are shown positioned internal to the second portion under the cover of the lens, in the second integrated assembly 200 the antenna system 210 is shown positioned external of the lens 222, and more particularly in an annular array coupled to the bezel of the base plate 216. As shown, the antenna system 210 is provided as a small form factor array of elements 218, for instance Balanced Antipodal Vivaldi Antenna (BAVA) elements. As shown, the array 218 includes a plurality of individual elements 224 arranged in an annular array surrounding the perimeter of the base plate 216 and configured, for example, for accurate direction finding (DF) of a received signal.

Further, whereas the first integrated assembly 100 includes a plurality of LED fixtures provided in a ring encircling the central element, the second integrated assembly 200 includes one larger form factor LED fixture 220 mounted on the 'top' surface of the base plate 216. As shown, the LED fixture 220 is mounted at the general central location of the base plate 216. In all embodiments, the configuration of the antenna system may be determinative of the light fixture count and position(s), and vice versa. For example, whereas the parasitic array depicted in the first integrated assembly 100 allows for a lighting assembly provided as a ring array, the position of the central element 124 in the first integrated assembly 100 conflicts with the LED fixture 220 position in the second integrated assembly 200. Therefore, some antenna systems may be compatible with some lighting systems while others may not, due at least in part to the positional requirements of the system elements.

Figure 3:
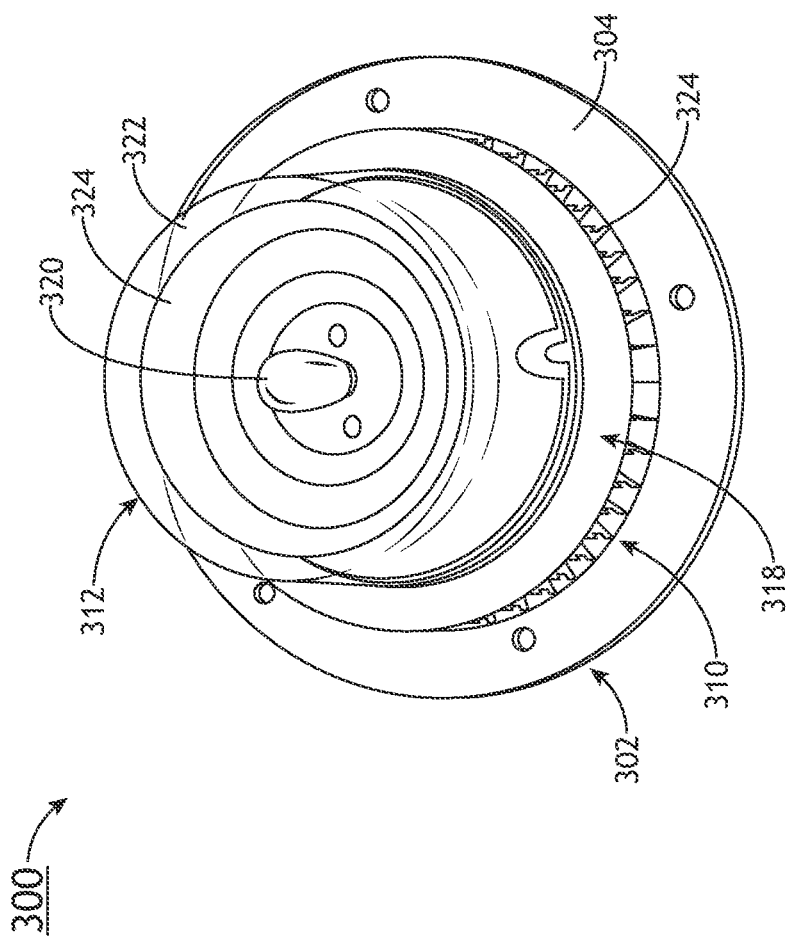
FIG. 3 illustrates an integrated assembly including an annular antenna array surrounding a lighting element in accordance with an exemplary embodiment of the present disclosure.

Referring to FIG. 3, another embodiment of an integrated assembly is shown generally at 300. The integrated assembly 300 includes an aerodynamic housing 302 having an annular flange 304 with apertures for mounting the assembly to an exterior of an aircraft. The lighting system 312 may be disposed within a central opening of the housing 302. As shown, the lighting system 312 may be a self-contained assembly including a light fixture 320 centrally disposed within a transparent lens 322 further containing a reflector 324 and circuitry associated with the light fixture 320.

As shown, the antenna system 310 is provided as an annular array 318 positioned external to the transparent lens 322 and incorporated into or otherwise mounted to the annular flange 304. In some embodiments, the annular array 318 may be a BAVA array including a plurality of individual BAVA elements 324 arranged in an annular array surrounding the perimeter of the transparent lens 322 and configured, for example, for accurate DF of a received signal, among or in addition to other functions.

Referring to FIGS. 4A and 4B, another embodiment of an integrated assembly is shown generally at 400. As shown, the aerodynamic housing 402 of the integrated assembly 400 is formed as a position light configured to be mounted external to an aircraft. The aerodynamic housing 402 generally includes a first portion 404 for being received in an aperture in an airframe and a second portion 406 for being mounted external to the aircraft. One or more connectors 408 may be provided at a terminal end of the first portion 404 for connecting with a power source internal to the aircraft. In some embodiments, an externally threaded connector may be provided at the terminal end of the first portion 404 for being received in an internally threaded portion in the airframe.

As shown, the second portion 406 is positioned 'atop' the first portion 404 and contains one or more light fixtures 420 of the lighting system 412 positioned under the cover of the transparent lens 422 coupled to the base plate 416. As further shown, the antenna system 410, for instance a Ku-band parasitic array, is positioned atop the second portion 406 and provides, for example, one or more of communication, navigational, sensing, and flight-critical functions, while the lighting system 412 may provide illumination for the exterior of the aircraft. In some embodiments, the integrated assembly 400 may further include a reflector and heat sink provided in the second portion 406.

Figure 5:
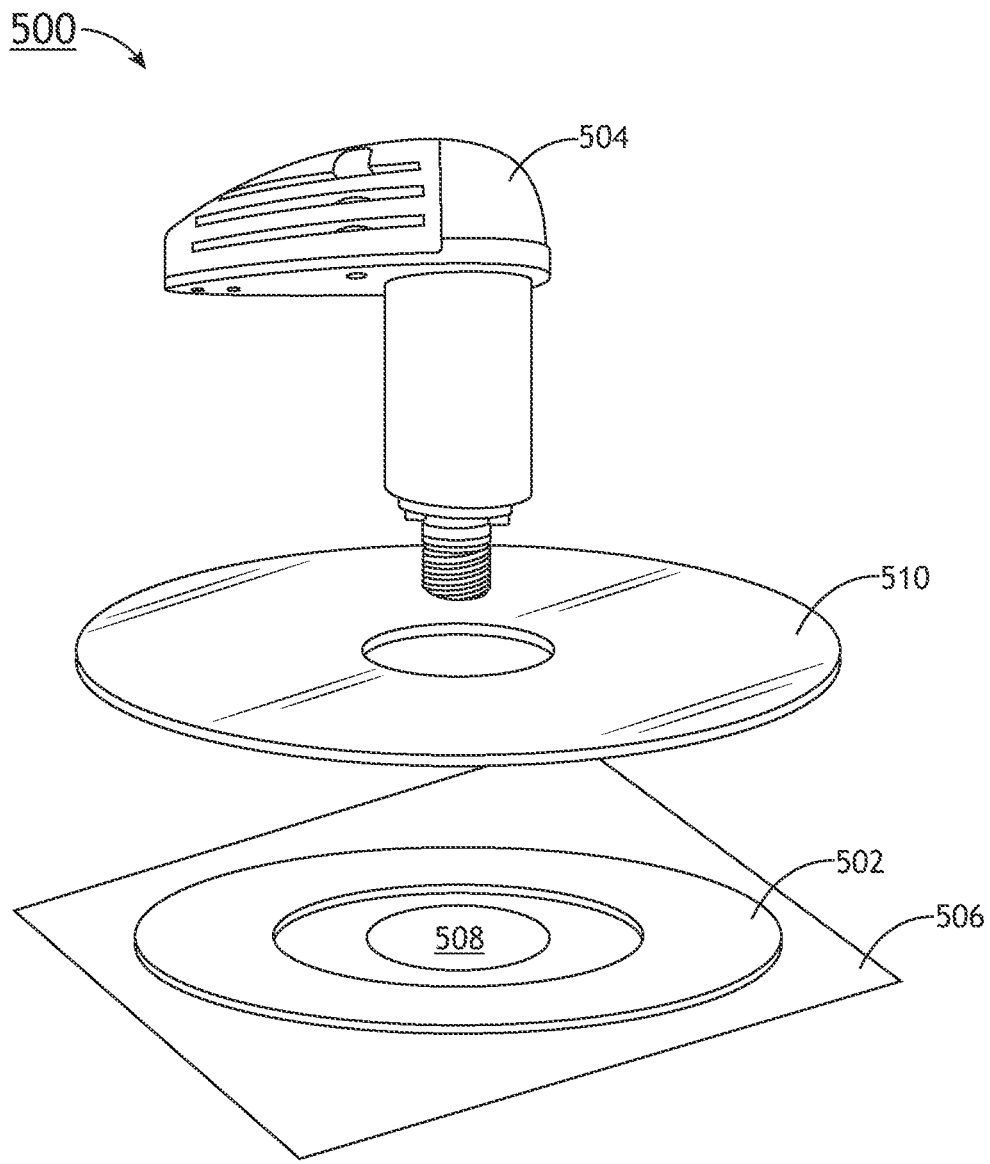
FIG. 5 illustrates an integrated assembly including an RSW antenna positioned around a perimeter of a lighting assembly.

Referring to FIG. 5, another embodiment of an antenna assembly is shown at reference numeral 500 for integration with a lighting system, for instance an existing light fixture. The antenna assembly 500 generally includes a patch (e.g., flat) antenna 502, for instance a reduced surface wave (RSW) microstrip antenna configured to be positioned around a perimeter of a light fixture 504, for example the light fixture shown in FIGS. 4A and 4B for purposes of illustration only. In some embodiments, the RSW microstrip antenna may be a shorted annular ring (SAR) microstrip antenna element including an annular microstrip patch of predetermined radius and short-circuit wall at the inner radius. In some embodiments, the antenna may be a stacked, dual-band RSW microstrip antenna allowing for signal reception at the L1 and L2 GPS bands required for high-precision applications.

The RSW microstrip antenna is positioned on a ground plane 506, for instance an electromagnetic band gap (EBG) ground plane, having any functional shape such as round or square. In some embodiments, the RSW microstrip antenna may be a printed circuit board (PCB) that incorporates a stacked upper and lower metallization separated by a dielectric layer. Each of the upper and lower conductive surfaces may have their own local ground, for example, the upper higher frequency L1 antenna may use the top side metallization of the lower antenna, for the lower L2 frequency, as its ground along with ground plane 506, thereby providing a "stepped ground" for the upper L1 antenna. The ground plane 506 may be a metallic plate bound to the lower metallization of the bottom antenna.

An opening 508 is provided through the ground plane, for instance a center opening (i.e., inward of an edge), for receiving a portion of the light fixture 504 therethrough and for aligning with center openings through the patch antenna and radome as discussed further below. The patch antenna 502 and ground plane 506 may be constructed from flexible material to be conformal to the fuselage of the aircraft, for instance curved. In some embodiments, the patch antenna 502 and the ground plane 506 may be configured to operate in the L1 and L2 frequency bands used in military aircraft, the L1 and L5 frequency bands used in civilian aircraft, or both.

In some embodiments, the patch antenna 502 may have an annular ring geometry formed as circular, elliptical, or other shape having a center opening. In some embodiments, the patch antenna 502 has an inner circumferential surface and an outer circumferential surface concentrically arranged, with the inner circumferential surface electrically connected to the fuselage and forming a center opening defining the confines for positioning the light fixture. As shown, the annular ring may be elliptical to correspond to the elliptical shape of the upper portion of the light fixture, or to better conform to a curved fuselage, while the opening through the ground plane 506 may be circular to correspond to the shape of the lower portion of the light fixture and aperture.

As configured for military use, the patch antenna 502 may include an RSW antenna configured to resonate in the GPS L1 band and a second RSW Antenna configured to resonate in the GPS L2 band, where the L1 antenna sits atop the L2 antenna. The bottom metallization of the L1 antenna PCB may be a metallurgical co-joint with the top metallization of the L2 antenna. The center opening through the patch antenna 502 may be shaped as a circle or ellipse to generally correspond to the perimeter shape of the upper portion of the light fixture 504. As such, the upper portion of the light fixture 504 is positioned within the confines of the shorted inner radius of the patch antenna 502 such that the lighting system does not obstruct the radio waves radiated or received by the patch antenna 502. In order words, the opening at center of the patch antenna isolates and reduces interference for lighting structures integrated at the center of the patch antenna 502. As the radio waves radiate horizontally outward and the lighting assembly is positioned within the bounds of or atop the center opening, mutual interference between the two subassemblies (i.e., RF and optical) is minimized.

In some embodiments, the patch antenna 502 is positioned beneath the cover of a radome 510 which may be thermoformed or otherwise manufactured, for instance from polycarbonate. The radome 510 is configured to be mounted on the fuselage of the aircraft and has a shape generally corresponding to the shape of the patch antenna 502 and includes a center opening for receiving the base of the lighting fixture therethrough. When assembled, the center opening of each of the ground plane 506, patch antenna 502 and radome 510 align to receive at least a portion of the light fixture 504 therethrough. The upper portion of the light fixture 504 may install within or atop the radome 510. The size and shape of the radome, and the size and shape of the center opening, may be configured based on the size and shape of the patch antenna and size and shape of the lighting fixture, respectively. Other factors considered in radome configuration include, but are not limited to, structural attachment to the fuselage, antenna-to-radome gap requirements, ventilation and/or decompression requirements, structural clearance requirements, fuselage geometry, etc. In some embodiments, the radome may mount to the fuselage and the lighting fixture may mount to the radome. In some embodiments, the radome 510 and light fixture 504 may be configured such that mounting of the light fixture to the airframe secures the radome in place. In other embodiments, portions of the radome and the lighting fixture may be integrally formed such that the mounting of one secured the other.

Figure 6:
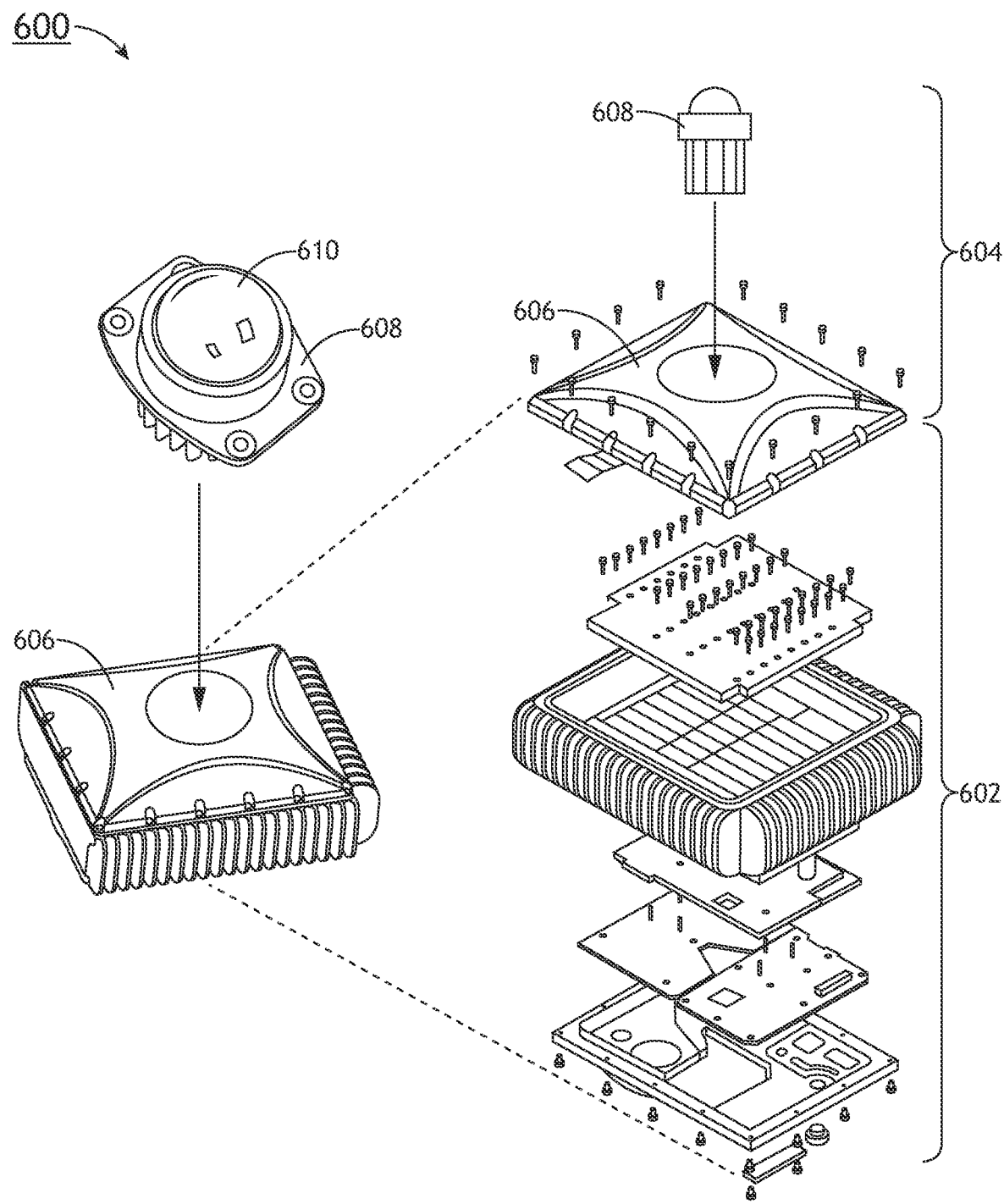
FIG. 6 illustrates an integrated assembly including a lighting element disposed in a GPS Anti-Jam (AJ) antenna.

Referring to FIG. 6, another embodiment of an integrated assembly is shown generally at reference numeral 600. In some embodiments, assembly 600 integrates a lighting element in the form of a light fixture 608 in the center of a GPS multi-element array, for instance a GPS controlled reception pattern antenna (CRPA) including a plurality of periphery elements. As shown, the antenna/multi-function aperture content is provided in portion 602 and the lighting system content is provided in portion 604. In some embodiments, the cover 606 includes a center surface opening for receiving and seating a light fixture 608 having at least one light element disposed beneath a transparent lens 610, for instance a hemispherical lens, to be positioned external to the cover 606. In other embodiments, the dome lens 620 may be integrally formed with the cover 606 and the lighting circuitry may be disposed beneath the cover within the antenna housing. When installed, the lighting system is positioned 'atop' the cover in generally the center of the cover such that the lighting assembly does not obstruct the radio waves radiated or received by the antenna elements.

While particular examples of antennas and light fixtures have been discussed herein with reference to the various embodiments, it is understood that other systems may be utilized, for example, antenna assemblies that support a broad range of frequency bands. In some embodiments, larger antenna assemblies may be co-located in larger light fixtures (e.g., landing and taxi lights) to provide frequency coverage down to the L-band. Other examples of antenna assemblies for integration into lighting structures include, but are not limited to, circular BAVA arrays and other Vivaldi/TEM horn array variants, reflector-backed monopole circular arrays, sectoral horn arrays, squatty biconical antennas, radial T-line antennas (e.g., CDISK), microwave frequency pill box antennas, other ground plane driven antennas, etc.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A combination antenna and light fixture assembly, comprising:
   a ground plane having a center opening;
   a patch antenna positioned on the ground plane, the patch antenna configured as an annular ring having an inner circumferential surface and an outer circumferential surface concentrically formed, and a center opening formed at least in part by the inner circumferential surface; and
   a radome covering the patch antenna, the radome having a center opening;
   wherein the center opening of each of the ground plane, the patch antenna, and the radome vertically align and receive a portion of a light fixture therethrough, and
   wherein the inner circumferential surface of the patch antenna is dimensioned such that the portion of the light fixture received through the center opening of the ground plane, the patch antenna, and the radome is positioned within the bounds of the inner circumferential surface of the patch antenna.

2. The assembly according to claim 1, wherein the radome has an annular ring shape corresponding to the annular ring shape of the patch antenna.

3. The assembly according to claim 1, wherein a portion of the radome is integrally formed with the portion of the light fixture.

4. The assembly according to claim 1, wherein the radome is adapted to mount to at least one of the light fixture and an aircraft fuselage.

5. The assembly according to claim 1, wherein each of the ground plane and the patch antenna are conformable to a curved aircraft fuselage.

6. The assembly according to claim 1, wherein the patch antenna comprises a first reduced surface wave (RSW) antenna configured to resonate in the global positioning system (GPS) L1 band and a second RSW antenna configured to resonate in the GPS L2 band, wherein the first RSW sits atop the second RSW antenna, and wherein a bottom metallization of the first RSW antenna may be a metallurgical co-joint with the top metallization of the second RSW antenna.

7. The assembly according to claim 1, wherein functionality of the patch antenna is mutually exclusive of functionality of the light fixture.

8. The assembly according to claim 1, wherein the annular ring of the patch antenna is circular or elliptical.

9. The assembly according to claim 1, wherein the patch antenna is configured to radiate radio waves horizontally outward.

* * * * *